United States Patent
Smith et al.

(10) Patent No.: US 9,446,841 B2
(45) Date of Patent: Sep. 20, 2016

(54) METHOD AND APPARATUS FOR IMPROVED VIBRATION ISOLATION

(75) Inventors: Michael R. Smith, Colleyville, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 677 days.

(21) Appl. No.: 13/133,669

(22) PCT Filed: Dec. 18, 2008

(86) PCT No.: PCT/US2008/087419
§ 371 (c)(1),
(2), (4) Date: Jun. 9, 2011

(87) PCT Pub. No.: WO2010/071649
PCT Pub. Date: Jun. 24, 2010

(65) Prior Publication Data
US 2011/0259687 A1  Oct. 27, 2011

(51) Int. Cl.
*F16F 13/08* (2006.01)
*B64C 27/00* (2006.01)
*B64C 29/00* (2006.01)
*F16F 13/06* (2006.01)
*F16F 13/26* (2006.01)

(52) U.S. Cl.
CPC ......... *B64C 27/001* (2013.01); *B64C 29/0033* (2013.01); *F16F 13/06* (2013.01); *F16F 13/262* (2013.01)

(58) Field of Classification Search
CPC ......... F16F 9/342; F16F 13/08; F16F 13/262
USPC .............. 188/266.2, 266.5, 283; 267/140.14, 267/140.15
See application file for complete search history.

(56) References Cited

U.S. PATENT DOCUMENTS

| | | | |
|---|---|---|---|
| 2,819,131 A | 5/1955 | Lankford |
| 2,964,272 A | 7/1955 | Olson |
| 3,088,062 A | 4/1963 | Hudimac |
| 4,236,607 A | 12/1980 | Halwes |
| 4,452,437 A | 6/1984 | Lochner |
| 4,600,863 A | 7/1986 | Chaplin et al. |
| 4,629,039 A | 12/1986 | Imoto et al. |
| 4,723,085 A | 2/1988 | Mukohjima et al. |

(Continued)

FOREIGN PATENT DOCUMENTS

| | | |
|---|---|---|
| CA | 2182275 A1 | 6/1996 |
| CA | 2422391 A1 | 2/2007 |

(Continued)

OTHER PUBLICATIONS

Extended European Search Report in related European application No. 08879030, mailed Apr. 26, 2013, 6 pages.

(Continued)

*Primary Examiner* — Bradley King
(74) *Attorney, Agent, or Firm* — James E. Walton

(57) ABSTRACT

A tunable vibration isolator having a housing, fluid chamber, and at least one tuning passage. A piston assembly is resiliently disposed within the housing. A vibration isolation fluid is allowed to flow from the fluid chambers through the tuning passage. A metering valve is actuated up and down in order to change the effective diameter of the tuning passage, resulting in a change to the isolation frequency.

18 Claims, 8 Drawing Sheets

(56) References Cited

U.S. PATENT DOCUMENTS

| | | | |
|---|---|---|---|
| 4,725,019 A | 2/1988 | White | |
| 4,869,474 A | 9/1989 | Best et al. | |
| 4,877,225 A * | 10/1989 | Noguchi et al. | 267/140.14 |
| 5,022,628 A | 6/1991 | Johnson et al. | |
| 5,130,948 A | 7/1992 | Laukien et al. | |
| 5,174,552 A | 12/1992 | Hodgson et al. | |
| 5,242,158 A * | 9/1993 | Robic et al. | 267/140.14 |
| 5,265,552 A | 11/1993 | Taylor | |
| 5,332,203 A | 7/1994 | Gossman et al. | |
| 5,435,531 A | 7/1995 | Smith et al. | |
| 5,439,082 A | 8/1995 | McKeown et al. | |
| 5,458,222 A | 10/1995 | Pla et al. | |
| 5,520,375 A | 5/1996 | Leibach et al. | |
| 5,568,847 A | 10/1996 | Guilloud et al. | |
| 5,704,596 A | 1/1998 | Smith et al. | |
| 5,732,905 A | 3/1998 | Krysinski | |
| 5,788,372 A | 8/1998 | Jones et al. | |
| 5,803,213 A | 9/1998 | Davis et al. | |
| 5,848,782 A | 12/1998 | Hein et al. | |
| 5,862,895 A | 1/1999 | Ricard | |
| 5,906,254 A | 5/1999 | Schmidt et al. | |
| 5,927,699 A | 7/1999 | Nakajima et al. | |
| 5,947,457 A | 9/1999 | Swanson et al. | |
| 5,957,440 A | 9/1999 | Jones et al. | |
| 5,988,610 A * | 11/1999 | Hiraki et al. | 267/140.13 |
| 6,009,983 A | 1/2000 | Stamps et al. | |
| 6,032,936 A | 3/2000 | Redinger | |
| 6,116,179 A | 9/2000 | Swinbanks et al. | |
| 6,123,312 A | 9/2000 | Dai | |
| 6,129,306 A | 10/2000 | Pham | |
| 6,217,011 B1 | 4/2001 | Redinger | |
| 6,293,532 B2 | 9/2001 | McGuire | |
| 6,340,153 B1 | 1/2002 | Miesner | |
| 6,389,941 B1 | 5/2002 | Michler | |
| 6,394,432 B1 | 5/2002 | Whiteford | |
| 6,427,815 B1 | 8/2002 | Zeller | |
| 6,454,206 B2 | 9/2002 | Vincent | |
| 6,695,106 B2 | 2/2004 | Smith et al. | |
| 7,013,832 B2 | 3/2006 | Sexton et al. | |
| 7,828,525 B2 * | 11/2010 | Stamps et al. | 416/134 A |
| 8,104,750 B2 * | 1/2012 | Hasegawa et al. | 267/140.14 |
| 2002/0060268 A1 | 5/2002 | Smith et al. | |

FOREIGN PATENT DOCUMENTS

| | | | |
|---|---|---|---|
| CA | 2485830 A1 | 2/2007 | |
| CN | 1708650 A | 12/2005 | |
| DE | 4407962 C1 | 6/1995 | |
| DE | 19744634 A1 * | 4/1998 | |
| DE | 19743543 A1 * | 4/1999 | F16F 9/10 |
| EP | 0290181 A | 11/1988 | |
| EP | 0528592 A1 | 2/1993 | |
| EP | 0537927 B1 | 4/1993 | |
| EP | 0554057 | 8/1993 | |
| EP | 0760437 A | 3/1997 | |
| EP | 0800938 A2 | 10/1997 | |
| EP | 1334289 B1 | 8/2003 | |
| FR | 2703121 | 9/1994 | |
| GB | 2358900 A | 8/2001 | |
| JP | 61171686 | 2/1986 | |
| WO | 83/03700 A1 | 10/1983 | |
| WO | 88/05506 | 7/1988 | |
| WO | 89/05930 A1 | 6/1989 | |
| WO | 91/15687 A1 | 10/1991 | |
| WO | 03/104675 A | 12/2003 | |

OTHER PUBLICATIONS

International Search Report mailed by ISA/USA, U.S. Patent and Trademark Office on Feb. 3, 2009 for International Patent Application No. PCT/US08/87419.
Chinese Office Action in Chinese counterpart Application No. 200880132425.0, issued by State Intellectual Property Office of the People's Republic of China, Nov. 26, 2012.
Canadian Examination Report in related Canadian patent application No. 2,746,048, mailed May 15, 2013, 2 pages.
Chinese Examination Report in related Chinese patent application No. 200880132425.0, mailed Jun. 9, 2013, 10 pages.
International Search Report and Written Opinion of the International Searching Authority mailed by ISA/USA, U.S. Patent and Trademark Office on Jan. 25, 2010 for International Patent Application No. PCT/US09/36871.
International Search Report and the Written Opinion of the International Searching Authority mailed by ISA/USA, U.S. Patent and Trademark Office on Jan. 28, 2010 for International Patent Application No. PCT/US09/66263, 8 pages.
Chinese First Office Action in Chinese counterpart Application No. 200910225341.8, issued by State Intellectual Property Office of the People's Republic of China, Sep. 1, 2011.
Office Action from U.S. Patent and Trademark Office on Nov. 10, 2011 from corresponding U.S. Appl. No. 10/528,920.
Office Action from U.S. Patent and Trademark Office on Jul. 26, 2011 from corresponding U.S. Appl. No. 10/528,920.
Office Action from U.S. Patent and Trademark Office on Mar. 29, 2011 from corresponding U.S. Appl. No. 10/528,920.
Office Action from U.S. Patent and Trademark Office on Oct. 21, 2010 from corresponding U.S. Appl. No. 10/528,920.
Office Action in Canadian counterpart Application No. 2,497,417, issued by Canadian Intellectual Property Office, Jan. 15, 2010.
International Search Report and Written Opinion for PCT/US07/79686 dated Sep. 10, 2008.
International Preliminary Report on Patentability for PCT/US07/79686 dated Dec. 14, 2010.
First Office Action in Chinese Application No. 200780100866.8 by Chinese Patent Office, dated Apr. 25, 2011.
Office Action in Canadian counterpart Application No. 2,497,417, issued by Canadian Intellectual Property Office, Dec. 16, 2010.
European Search Report in European counterpart Application No. 09169361.4, completed by European Patent Office, Dec. 9, 2010.
Nixon M.W. et al, Tiltrotor Vibration Reduction Through Higher Harmonic Control, Journal of the American Helicopter Society, Jul. 1998, 235-245, vol. 43, No. 3, Alexandria, VA, US.
European Search Report in European counterpart Application No. 09169320, completed by European Patent Office, Dec. 14, 2010, 3 pages.
European Search Report in European counterpart Application No. 09169354, completed by European Patent Office, Dec. 14, 2010, 7 pages.
European Search Report in European counterpart Application No. 09169360.6, issued by European Patent Office, Dec. 30, 2010, 8 pages.
European Search Report in European counterpart Application No. 09169365, completed by European Patent Office, Dec. 14, 2010, 7 pages.
European Search Report in European counterpart Application No. 09169361, completed by European Patent Office, Dec. 9, 2010, 6 pages.
Notice of Allowance in Canadian counterpart Application No. 2,497,417, issued by Canadian Intellectual Property Office, Jul. 6, 2011.
European Search Report in European counterpart Application No. 03816302.8, completed by European Patent Office, Jul. 27, 2006, 7 pages.
International Preliminary Examination Report of the International Preliminary Examination Authority mailed by ISA/ USA, U.S. Patent and Trademark Office on Jul. 1, 2005 for International Patent Application No. PCT/US03/30324, 7 pages.
International Preliminary Report on Patentability of the International Searching Authority mailed by ISA/USA, U.S. Patent and Trademark Office on Nov. 18, 2011 for International Patent Application No. PCT/US08/87419, 4 pages.
Office Action dated Jun. 18, 2014 from counterpart CN App. No. 200880132425.0.
Chinese Examination Report in related Chinese patent application No. 200880132425.0, mailed Feb. 2, 2016, 10 pages.

* cited by examiner

METHOD AND APPARATUS FOR IMPROVED VIBRATION ISOLATION

TECHNICAL FIELD

The present application relates in general to active vibration control. More specifically, the present application relates to methods and apparatus for isolating mechanical vibrations in structures or bodies that are subject to harmonic or oscillating displacements or forces. The present application is well suited for use in the field of aircraft, in particular, helicopters and other rotary wing aircraft.

DESCRIPTION OF THE PRIOR ART

For many years, effort has been directed toward the design of apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the craft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters is disclosed in commonly assigned U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator, in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in commonly assigned U.S. Pat. No. 5,439,082, titled "Hydraulic Inertial Vibration Isolator," issued 8 Aug. 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in commonly assigned U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

Another area of improvement in the design of the Halwes-type isolator has been in an effort directed toward a means for changing the isolator's frequency in order to increase the isolator's effectiveness during operation. One development in the design of such isolators is disclosed in commonly assigned U.S. Pat. No. 5,435,531, titled "Vibration Isolation System," issued 25 Jul. 1995, to Smith et al. (Smith '531). In Smith '531, an axially extendable sleeve is used in the inner wall of the tuning passage in order to change the length of the tuning passage, thereby changing the isolation frequency. Another development in the design of tunable Halwes-type isolators was disclosed in commonly assigned U.S. Pat. No. 5,704,596, titled "Vibration Isolation System," issued 6 Jan. 1998, to Smith et al. (Smith '596). In Smith '596, a sleeve is used in the inner wall of the tuning passage in order to change the cross sectional area of the tuning passage itself, thereby changing the isolation frequency during operation. Both Smith '531 and Smith '596 were notable attempts to actively tune the isolator.

Another development in the area of vibration isolation is the tunable vibration isolator disclosed in U.S. Pat. No. 6,695,106, titled "Method and Apparatus for Improved Vibration Isolation," issued 24 Feb. 2004, to Smith et al, which is hereby incorporated by reference.

Although the foregoing developments represent great strides in the area of vibration isolation, many shortcomings remain.

BRIEF DESCRIPTION OF THE DRAWINGS

The novel features believed characteristic of the application are set forth in the appended claims. However, the application itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
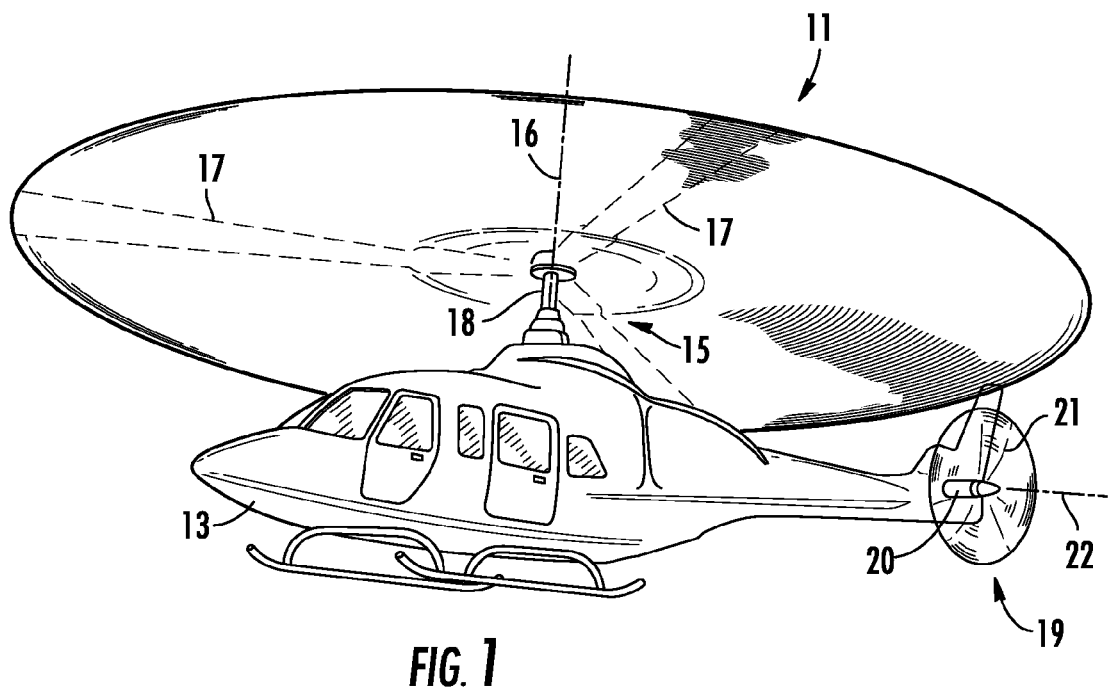
FIG. 1 is a perspective view of a helicopter according to the present application.

Referring to FIG. 1 in the drawings, a helicopter 11 according to the present application is illustrated. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a vertical axis 16 of main rotor shaft 18. Tail rotor blades 21 generally rotate about a lateral axis 22 of tail rotor shaft 20. Helicopter 11 also includes a vibration isolation system according to the present application for isolating fuselage 13 or other portions of helicopter 11 from mechanical vibrations, such as harmonic vibrations, which are associated with the propulsion system and which arise from the engine, transmission, and rotors of helicopter 11.

Figure 2A:
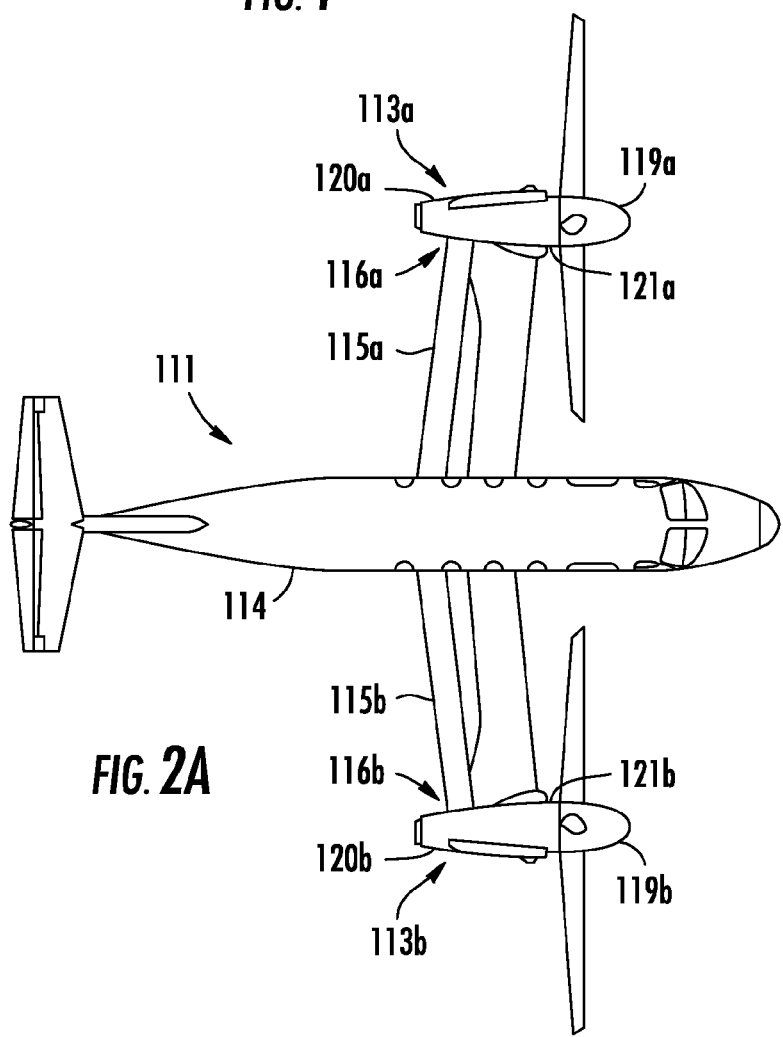
FIG. 2A is a plan view of a tilt rotor aircraft according to the present application in an airplane mode.
Figure 2B:
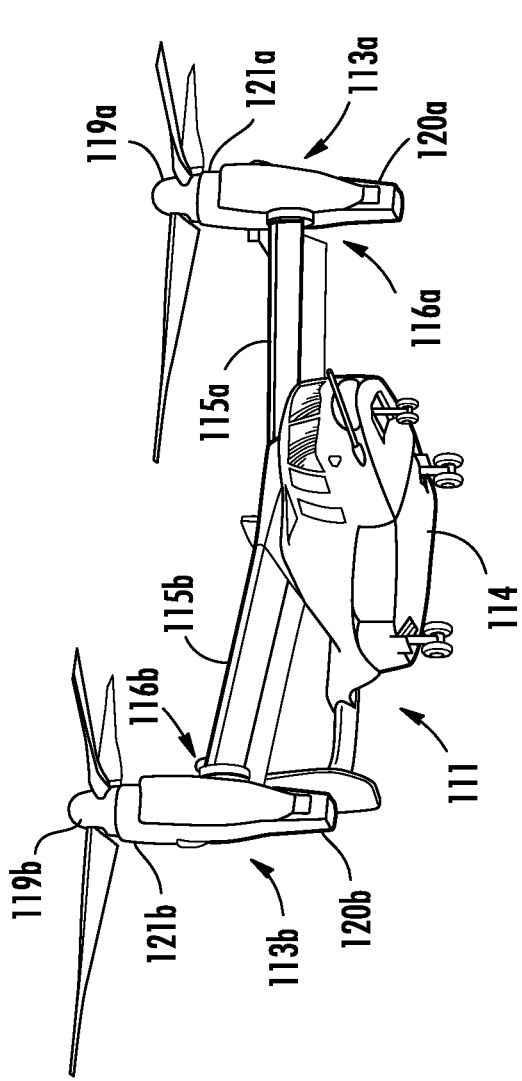
FIG. 2B is a perspective view of a tilt rotor aircraft according to the present application in a helicopter mode.

The present application may also be utilized on other types of rotary wing aircraft. Referring now to FIGS. 2A and 2B in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 also includes a vibration isolation system according to the present application for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
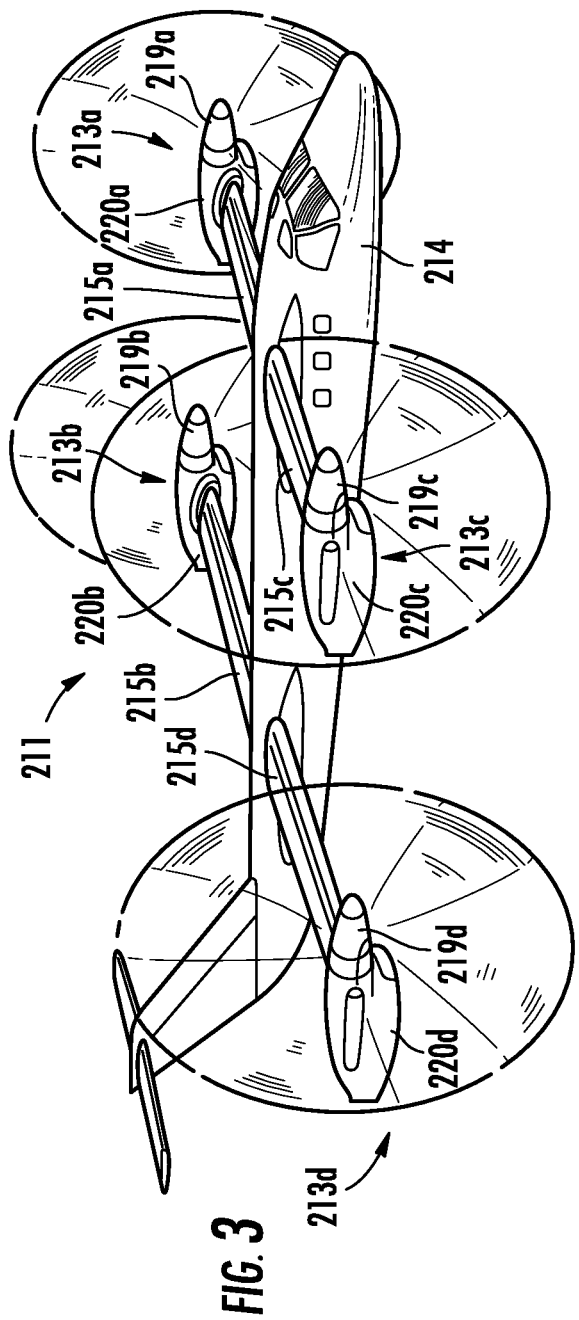
FIG. 3 is a perspective view of a quad tilt rotor aircraft according to the present application in an airplane mode.

Referring now to FIG. 3 in the drawings, a quad tilt rotor aircraft 211 according to the present application is illustrated. As with the tilt rotor aircraft 111 of FIGS. 2A and 2B, rotor assemblies 213a, 213b, 213c, and 213d are carried by a forward wing 215a, 215c, and an aft wing 215b, 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 also includes a vibration isolation system according to the present application for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211. It should be understood that the present application may be used with any aircraft on which it would be desirable to have vibration isolation according to the present application, including unmanned aerial vehicles that are remotely piloted.

Figure 4A:
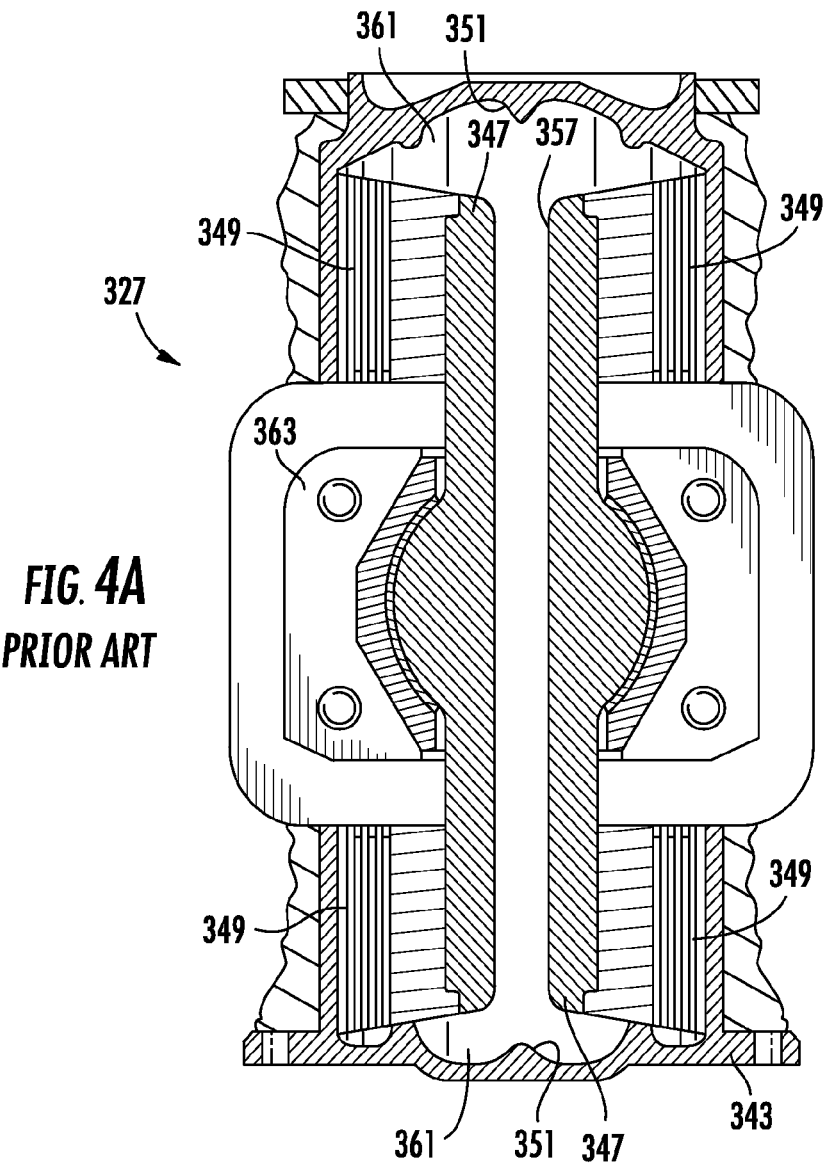
FIG. 4A is a cross-sectional view of a prior art liquid inertia vibration eliminator.

Referring now to FIG. 4A in the drawings, a prior art liquid inertia vibration eliminator (LIVE unit) 327 for use on an aircraft is illustrated. Prior art LIVE unit 327 includes a housing 343 that has a hollow, generally cylindrical interior. A piston 347 of selected cross-sectional diameter is disposed within the interior of housing 343. Housing 343 would typically be coupled to the fuselage of an aircraft (not shown) and piston 347 would typically be coupled to the transmission and propulsion system of the aircraft (not shown) via a pylon assembly at an attachment bracket 363. In such an arrangement, the fuselage serves as the body to be isolated from vibration, and the transmission of the aircraft serves as the vibrating body. An elastomeric seal and spring member 349 resiliently seals piston 347 within the interior of housing 343.

A fluid chamber 361 is defined by the interior of housing 343 and piston 347 and is sealed against leakage by elastomer member 349. A relatively high-density, low-viscosity vibration-isolation fluid, also referred to as tuning fluid, is disposed within fluid chamber 361. In addition to sealing the vibration-isolation fluid in fluid chamber 361, elastomer member 349 functions as a spring to permit piston 347 to move or oscillate relative to housing 343, while maintaining piston 347 in a central location in housing 343 when no load is applied.

A tuning port or passage 357 extends centrally through piston 347 and permits the vibration-isolation fluid to move from one end of fluid chamber 361 to the other. A conical flow diverter 351 is provided at each end of housing 343 and is aligned with and generally opposes the opening at each end of tuning passage 357. Each conical flow diverter 351 enhances fluid flow by decelerating the vibration-isolation fluid as it flows from each end of the fluid chamber into and out of passage 357.

Figure 4B:
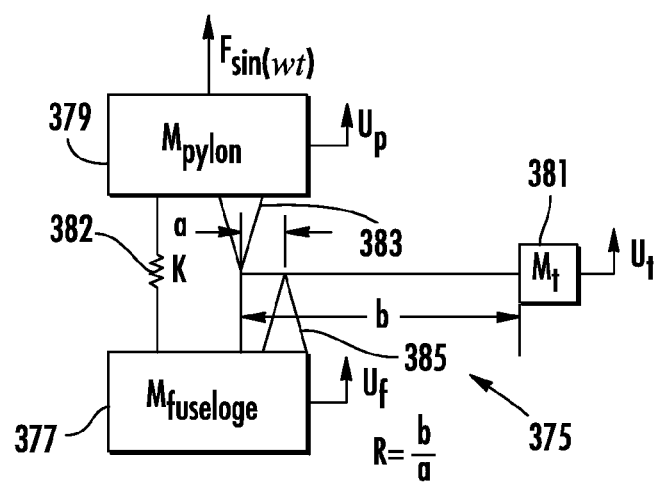
FIG. 4B is a force diagram of the prior art liquid inertia vibration eliminator of FIG. 4A.

Referring now to FIG. 4B in the drawings, a mechanical equivalent model 375 for the prior art LIVE unit 327 of FIG. 4A is illustrated. In mechanical equivalent model 375, a box 377 represents the mass of the fuselage $M_{fuselage}$; a box 379 represents the mass of the pylon assembly $M_{pylon}$, and a box 381 represents the mass of the tuning mass $M_t$, in this case, the vibration-isolation fluid. A vibratory force $F \cdot \sin(\omega t)$ is generated by the engine, transmission, and propulsion system. Force $F \cdot \sin(\omega t)$ is a function of the frequency of vibration of the transmission and propulsion system.

Force $F \cdot \sin(\omega t)$ causes an oscillatory displacement $u_p$ of the pylon assembly; an oscillatory displacement of the fuselage $u_f$; and an oscillatory displacement of the tuning mass $u_t$. Elastomer member 349 is represented by a spring 382 disposed between the fuselage $M_{fuselage}$ and the pylon assembly $M_{pylon}$. Spring 382 has a spring constant K.

In mechanical equivalent model 375, tuning mass $M_t$ functions as if cantilevered from a first fulcrum 383 attached to the pylon assembly $M_{pylon}$, and a second fulcrum 385 attached to the fuselage $M_{fuselage}$. The distance a from first fulcrum 383 to second fulcrum 385 represents the cross-sectional area of tuning port 357, and the distance b from first fulcrum 383 to the tuning mass $M_t$ represents the effective cross-sectional area of piston 347, such that an area ratio, or hydraulic ratio, R is equal to the ratio of b to a. Mechanical equivalent model 375 leads to the following equation of motion for the system:

$$\begin{bmatrix} M_{pylon} + (R-1)^2 M_t & -R(R-1)M_t \\ -R(R-1)M_t & M_{fuselage} + R^2 M_t \end{bmatrix} \begin{Bmatrix} \ddot{u}_p \\ \ddot{u}_f \end{Bmatrix} + \begin{bmatrix} K & -K \\ -K & K \end{bmatrix} \begin{Bmatrix} u_p \\ u_f \end{Bmatrix} = \begin{Bmatrix} F\sin(\omega t) \\ 0 \end{Bmatrix}$$

As is evident, no means for actively tuning LIVE unit 327 is available. Once the cross-sectional areas of tuning passage 357 and piston 347 are determined, and the tuning fluid is chosen, the operation of LIVE unit 327 is set, and cannot be altered without altering one or more of these features. On the other hand, the present application provides a means of actively tuning the functionality a LIVE unit during operation.

Figure 4C:
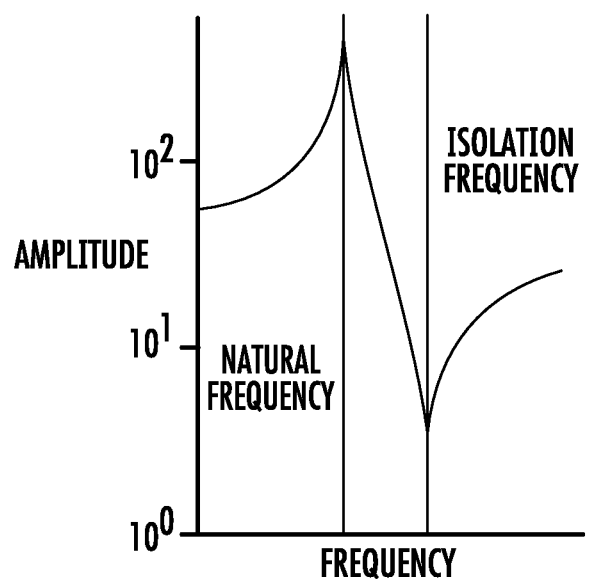
FIG. 4C is a plot of amplitude versus frequency for the prior art liquid inertia vibration eliminator of FIG. 4A.

Referring now to FIG. 4C in the drawings, a plot of amplitude versus frequency for LIVE unit 327 and mechanical equivalent model 375 is illustrated.

Figure 5A:
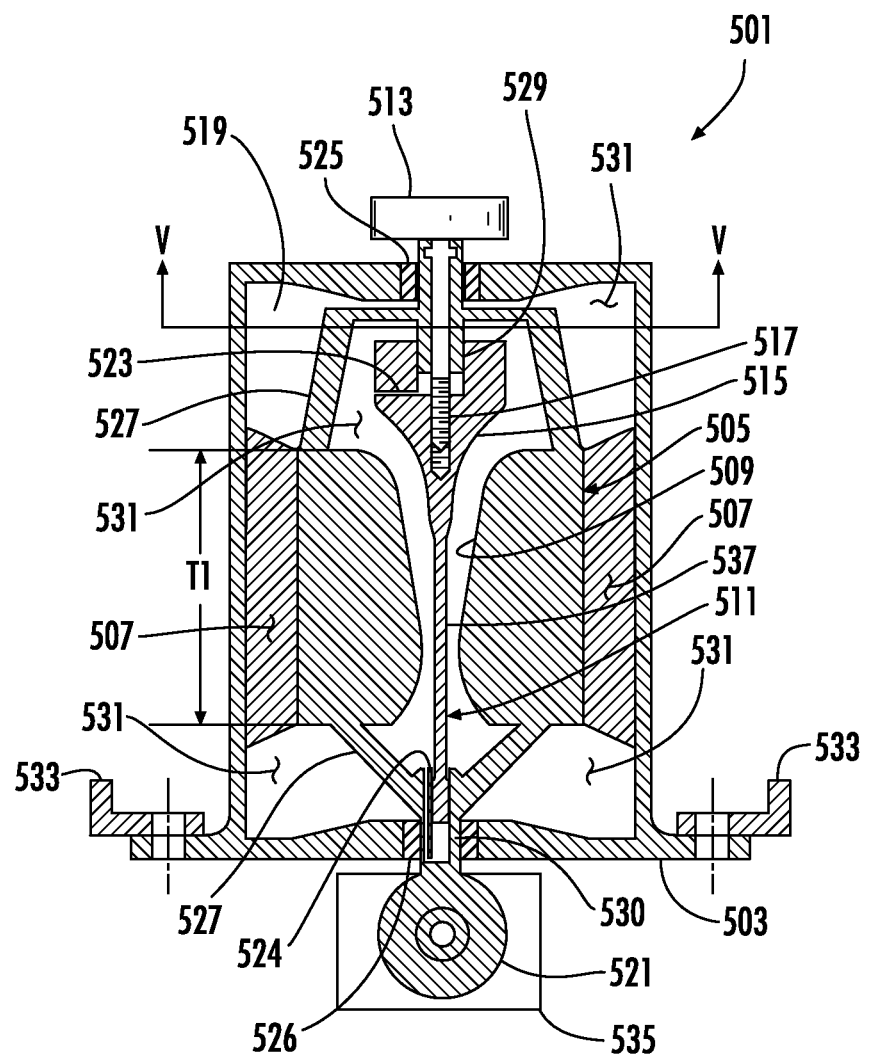
FIG. 5A is a cross-sectional view of a meterable liquid inertia vibration eliminator according to the preferred embodiment of the present application.
Figure 5B:
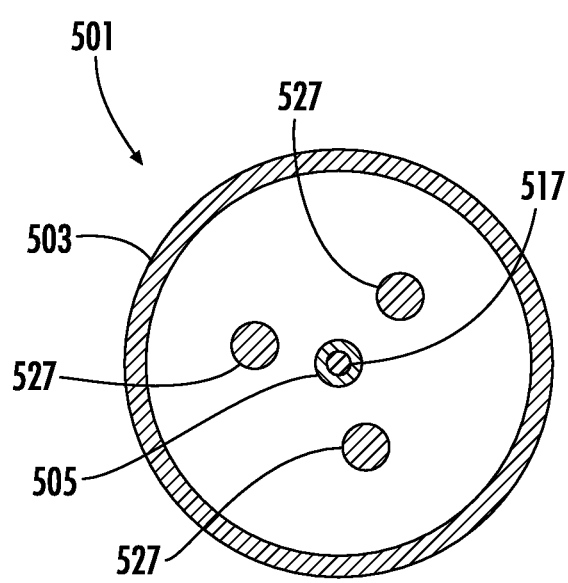
FIG. 5B is a cross-sectional view of the meterable liquid inertia vibration eliminator of FIG. 5A taken at V-V.

Referring now to FIGS. 5A and 5B in the drawings, a meterable liquid inertia vibration eliminator 501 according to the preferred embodiment of the present application is illustrated. Vibration isolator 501 comprises a housing 503 that has a hollow interior. A piston assembly 505 of selected cross-sectional diameter is disposed within the interior of housing 503. Piston assembly 505 is typically coupled to a vibrating body, such as a transmission of an aircraft (not shown) via a pylon assembly 535 at an attachment bracket 521. Housing 503 is typically coupled to a body to be isolated from vibration, such as a roof beam 533 of an airframe of an aircraft. In such an arrangement, the airframe serves as the body to be isolated from vibration, and the transmission of the aircraft serves as the vibrating body. An elastomer seal and spring member 507 seals and resiliently locates piston assembly 505 within the interior of housing 503.

Piston assembly 505 defines a generally elongated tuning passage 509 and includes a support frame 527 on each end of piston assembly 505. Support frame 527 supports an adjustable metering pin assembly 511 on each of end of piston assembly 505. Support frame 527 also acts as a structural conduit from bracket 521 to piston assembly 505, while allowing a selected vibration-isolation tuning fluid 531 to travel throughout housing 503. In the preferred embodiment, support frame 527 comprises a tripod structural configuration; however, support frame 527 could be any structural configuration which allows fluid travel through piston assembly 505 to housing 503. Metering pin assembly 511 comprises a bulb portion 515, a generally straight portion 537, a mechanical screw drive 517, one or more bores 529, and one or more seepage paths 523. In the embodiment of FIG. 5A, metering pin assembly 511 includes an upper bore 529, an upper seepage path 523, a lower bore 530, and a lower seepage path 524. Bulb portion 515 is preferably conical in shape and straight portion 537 is generally of constant diameter.

Bulb portion 515 serves to selectively restrict the flow of tuning fluid 531 through tuning passage 509. As such, it will be appreciated that the dimensions, contour, and shape of bulb portion 515 may match the dimensions, contour, and shape of tuning passage 509, or may be different, depending upon the desired response of meterable liquid inertia vibration eliminator 501. This feature applies to all of the embodiments of the meterable liquid inertia vibration eliminator disclosed herein.

A fluid chamber 519 is defined by the interior of housing 503 and piston assembly 505. Tuning fluid 531 is disposed in fluid chamber 519 and tuning passage 509. Tuning fluid 531 preferably has low viscosity, relatively high density, and non-corrosive properties. Elastomer member 507 functions at least as a spring to permit piston assembly 505 to move or oscillate relative to housing 503. When no load is applied, elastomer member 507 locates piston assembly 505 generally central in housing 503.

Tuning passage 509 extends centrally through a longitudinal axis of piston assembly 505, so as to divide fluid chamber 519 into two volumes that are in fluid communication. The approximate length of tuning passage 509, in relation to the physical features of piston assembly 505, is defined by T1 in FIG. 5A. Bulb portion 515 of metering pin assembly 511 is at least partially disposed within tuning passage 509. Metering pin assembly 511 is controlled by a metering pin actuator 513. Metering pin assembly 511 extends through housing 503 and is secured at one end by bore 529 and at the other end by bore 530. Bores 529, 530 secure metering pin assembly 511 in the radial direction while allowing metering pin assembly 511 to translate in the axial direction via mechanical screw drive 517. Seepage paths 523, 524 allow for pressure equalization between fluid chamber 519 and bores 529, 530, respectively, as metering pin assembly 511 translates relative to piston assembly 505 and housing 503. In order to prevent fluid leakage, an elastomer seal 525 is located at the interface of metering pin actuator 513 and housing 503, and another elastomer seal 526 is located between pylon attachment bracket 521 and housing 503.

The introduction of a force into pylon attachment bracket 521 translates piston assembly 505 relative to housing 503. The movement of piston assembly 505 forces isolation fluid 531 to move in the opposite direction through tuning passage 509. Movement of fluid 531 produces an inertial force that cancels, or isolates, the force from piston assembly 505 at a discrete frequency. The actuation of metering pin assembly 511 (via metering pin actuator 513) either up or down, increases or decreases, respectively, the effective diameter of tuning passage 509. Decreasing the effective diameter of tuning passage 509 is caused by further insertion of bulb portion 515 of metering pin assembly 511 into tuning passage 509. Increasing the effective diameter of tuning passage 509 is caused by partial retraction of bulb portion 515 of metering pin assembly 511 from tuning passage 509. Increasing or decreasing the effective diameter of tuning passage 509, increases or decreases, respectively, the isolation frequency. The essentially linear relationship between effective diameter (d) of tuning passage 509, diameter of piston assembly 505 (D), spring rate of elastomer member 507 (K), length T1 of tuning passage 509 (L), mass density of isolation fluid 531 (ρ), gravity (g), and the isolation frequency (f), is given by the following equation:

$$f = \sqrt{\frac{4Kg}{D^2\left(\frac{D^2}{d^2} - 1\right)\pi L\rho}}$$

Actuation of metering pin actuator 513, which translates metering pin assembly 511 via screw drive 517, provides a mechanical means for tracking frequency isolation during operation. For example, in an embodiment in which meterable liquid inertia vibration eliminator 501 is used in a helicopter application, actuation of metering pin actuator 513 may be driven mechanically by tracking rotor blade RPM. However, it will be appreciated that meterable liquid inertia vibration eliminator 501 could also be configured to track a measured frequency from selected instrumentation, such as accelerometers or other sensors. It should be understood that alternative embodiments may employ the use of electric actuators, hydraulic actuators, pneumatic actuators, electromagnetic actuators, or the like, to actuate metering pin actuator 513. This unique configuration allows for continuous tracking of frequency isolation.

According to the preferred embodiment of the present application, tuning passage 509 is generally circular in cross-section. Adjustable metering pin assembly 511 is translatable up and down by adjustment of metering pin actuator 513. In the embodiment of FIG. 5A, actuator 513 utilizes a mechanical screw drive 517 in order to translate metering pin assembly 511 relative to piston assembly 505. Although it is preferred that mechanical screw drive 517 is used to translate pin 511, it will be appreciated that alternative embodiments may employ any effective means to translate pin 511 relative to piston assembly 505. It is preferred that the diameter of tuning passage 509 enlarges near bulb portion 515 of metering pin assembly 511. This facilitates the introduction of metering pin assembly 515 into the opening of tuning passage 509.

Figure 6:
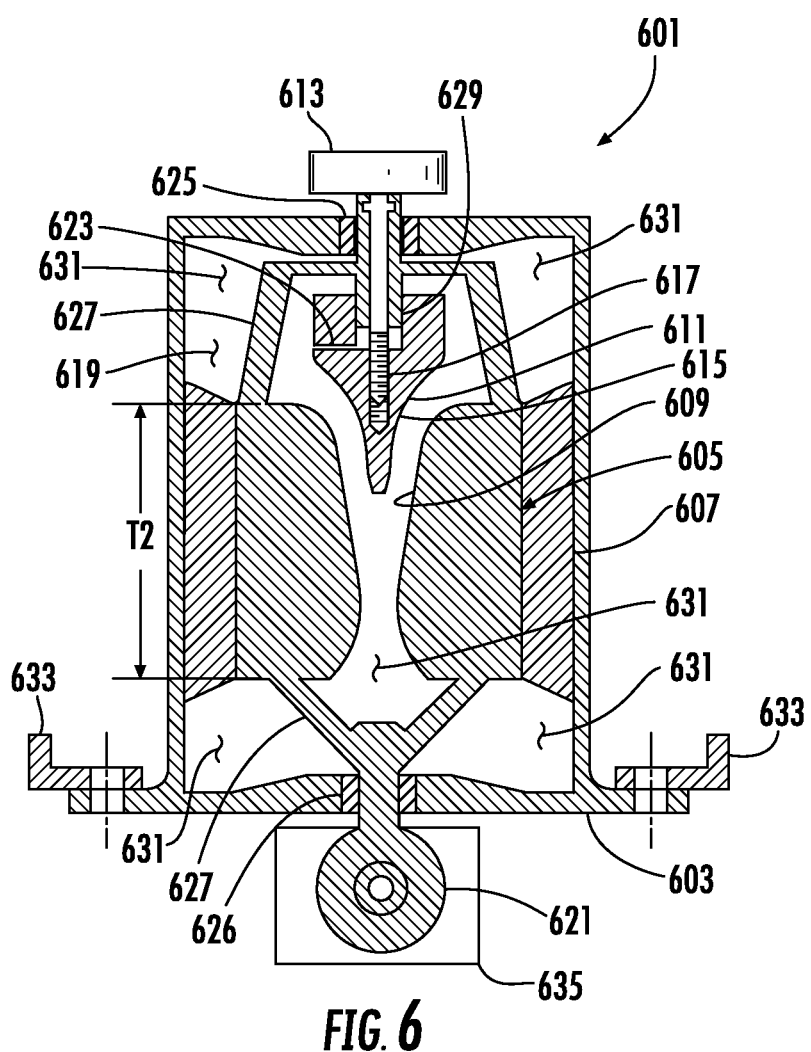
FIG. 6 is a cross-sectional view of an alternative embodiment of a meterable liquid inertia vibration eliminator according to the present application.

Referring now to FIG. 6 in the drawings, an alternative embodiment of a meterable liquid inertia vibration eliminator 601 is illustrated. Vibration isolator 601 comprises a housing 603 that has a hollow interior. A piston assembly 605 of selected cross-sectional diameter is disposed within the interior of housing 603. Piston assembly 605 is typically coupled to a vibrating body, such as a transmission of an aircraft (not shown) via a pylon assembly 635 at an attachment bracket 621. Housing 603 is typically coupled to a body to be isolated from vibration, such as a roof beam 633 of an airframe of an aircraft. In such an arrangement, the airframe serves as the body to be isolated from vibration, and the transmission of the aircraft serves as the vibrating body. An elastomer seal and spring member 607 seals and resiliently locates piston assembly 605 within the interior of housing 603.

Piston assembly 605 defines a tuning passage 609 and includes a support frame 627 on each end of piston assembly 605. In this embodiment, support frame 627 supports adjustable metering pin assembly 611 on only one end of piston assembly 605. Support frame 627 also acts as a structural conduit from bracket 621 to piston assembly 605 while allowing a selected vibration-isolation tuning fluid 631 to travel throughout housing 603. In this embodiment, support frame 627 comprises a tripod structural configuration; however, support frame 627 could be any structural configuration which allows fluid travel through piston assembly 605 and housing 603. Metering pin assembly 611 comprises a bulb portion 615, a mechanical screw drive 617, a bore 629, and a seepage path 623. Bulb portion 615 is preferably conical in shape; however, it will be appreciated that bulb portion 615 may be configured in other shapes, as bulb portion 615 serves to selectively restrict the flow of tuning fluid 631 through tuning passage 609.

A fluid chamber 619 is defined by the interior of housing 603 and piston assembly 605. Vibration-isolation fluid 631 is disposed in fluid chamber 619 and tuning passage 609. Vibration-isolation fluid 631 preferably has low viscosity, relatively high density, and non-corrosive properties. Elastomer member 607 functions at least as a spring to permit piston assembly 605 to move or oscillate relative to housing 603. When no load is applied, elastomer member 607 locates piston assembly 605 generally central in housing 603.

Tuning passage 609 extends centrally through a longitudinal axis of piston assembly 605, so as to divide fluid chamber 619 into two volumes that are in fluid communication. The approximate length of tuning passage 609, in relation to the physical features of piston assembly 605, is defined by T2 in FIG. 7. Bulb portion 615 of metering pin assembly 611 is at least partially disposed within tuning passage 609. Seepage path 623 allows for pressure equalization between fluid chamber 619 and bore 629, as metering pin assembly 611 translates relative to piston assembly 605 and housing 603. Metering pin assembly 611 is controlled by a metering pin actuator 613. Metering pin assembly 611 extends into housing 603 and is secured by bore 629. Bore 629 secures metering pin assembly 611 in the radial direction while allowing metering pin assembly 611 to translate in the axial direction via mechanical screw drive 617. In order to prevent fluid leakage, an elastomer seal 625 is located at the interface of metering pin actuator 613 and housing 603, and an elastomer seal 626 is located between pylon attachment bracket 621 and housing 603.

The introduction of a force into pylon attachment bracket 621 translates piston assembly 605 relative to housing 603. The movement of piston assembly 605 forces isolation fluid 631 to move in the opposite direction through tuning passage 609. Movement of fluid 631 produces an inertial force that cancels, or isolates, the force from piston assembly 605 at a discrete frequency. The actuation of metering pin assembly 611 (via metering pin actuator 613) either up or down, increases or decreases, respectively, the effective diameter of tuning passage 609. Decreasing the effective diameter of tuning passage 609 is caused by further insertion of bulb portion 615 of metering pin assembly 611 into tuning passage 609. Increasing the effective diameter of tuning passage 609 is caused by partial retraction of bulb portion 615 of metering pin assembly 611 from tuning passage 609. Increasing or decreasing the effective diameter of tuning passage 609, increases or decreases, respectively, the isolation frequency. The essentially linear relationship between effective diameter (d) of tuning passage 609, diameter of piston assembly 605 (D), spring rate of elastomer member 607 (K), length T2 of tuning passage 609 (L), mass density of isolation fluid 631 (ρ), gravity (g), and the isolation frequency (f), is given by the following equation:

$$f = \sqrt{\frac{4Kg}{D^2\left(\frac{D^2}{d^2} - 1\right)\pi L \rho}}$$

Actuation of metering pin actuator 613, which translates metering pin assembly 611 via screw drive 617, provides a mechanical means for tracking frequency isolation during operation. For example, in an embodiment in which meterable liquid inertia vibration eliminator 601 is used in a helicopter application, actuation of metering pin actuator 613 may be driven mechanically by tracking rotor blade RPM. However, it will be appreciated that meterable liquid inertia vibration eliminator 601 could also be configured to track a measured frequency from selected instrumentation, such as accelerometers. It should be understood that alternative embodiments may employ the use of electric actuators, hydraulic actuators, pneumatic actuators, electromagnetic actuators, or the like, to actuate metering pin actuator 613. This unique configuration allows for continuous tracking of frequency isolation.

As is preferred, tuning passage 609 is generally circular in cross-section. Generally, the diameter of tuning passage 609 enlarges near bulb portion 615 of metering pin assembly 611. Adjustable metering pin assembly 611 translates up or down by adjustment of metering pin actuator 613. Actuator 613 utilizes a mechanical screw drive 617 in order to translate pin 611 up or down. Although it is preferred that mechanical screw drive 617 is used to translate pin 611, it will be appreciated that alternative embodiments may employ any effective means to translate pin 611 relative to piston assembly 605.

Figure 7:
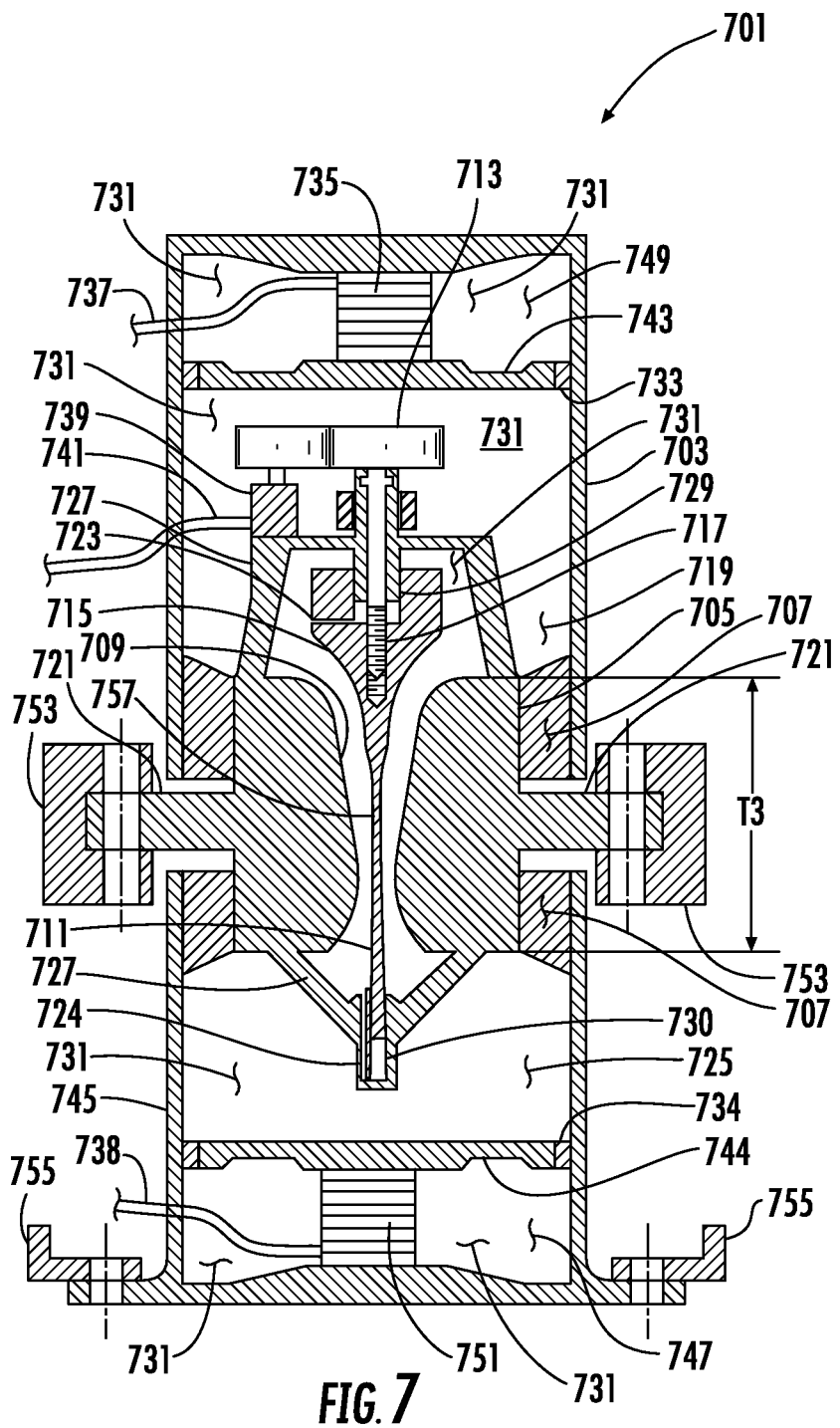
FIG. 7 is a cross-sectional view of another alternative embodiment of a meterable liquid inertia vibration eliminator according to the present application.

Referring now to FIG. 7 in the drawings, another alternative embodiment of a meterable liquid inertia vibration eliminator is illustrated. In this embodiment, a meterable liquid inertia vibration eliminator 701 includes the addition of active tuning elements. Vibration eliminator 701 comprises an upper housing 703 and a lower housing 745, each having a hollow interior. A piston assembly 705 defines a tuning passage 709 of selected cross-sectional diameter and connects upper housing 703 and lower housing 745. Lower housing 745 is typically coupled to a body to be isolated from vibration, such as a roof beam 755 of an airframe of an aircraft. In such an arrangement, the airframe serves as the body to be isolated from vibration, and the transmission of the aircraft serves as the vibrating body. A respective elastomer seal and spring member 707 seals and resiliently couples piston assembly 705 to upper housing 703 and lower housing 745.

Piston assembly 705 defines a tuning passage 709 and includes a support frame 727 on each end of piston assembly 705. Support frame 727 supports adjustable metering pin assembly 711 on each of end of piston assembly 705. Support frame 727 also acts as a structural conduit from bracket 721 to piston assembly 705, while allowing a selected vibration-isolation tuning fluid 731 to travel throughout upper housing 703 and lower housing 745. In this embodiment, support frame 727 has a tripod structural configuration; however, support frame 727 could be any structural configuration which allows tuning fluid 731 to travel through piston assembly 705, upper housing 703, and lower housing 745. Metering pin assembly 711 comprises a bulb portion 715, a generally straight portion 757, a mechanical screw drive 717, an upper bore 729, an upper seepage path 723, a lower bore 730, and a lower seepage path 724. Bulb portion 715 is generally conical in shape while straight portion 757 is preferably of constant diameter.

An upper fluid chamber 719 is defined by the interior of upper housing 703 and piston assembly 705. A lower fluid chamber 725 is defined by the interior of lower housing 745 and piston assembly 705. In addition, a lower tuning chamber 747 is defined by the interior of lower housing 745 and actuating piston assembly 743, and an upper tuning chamber 749 is defined by the interior of upper housing 703 and actuating piston assembly 743. Vibration-isolation tuning fluid 731 preferably has a low viscosity, a relatively high density, and non-corrosive properties. It is preferred in this embodiment that the fluid in upper fluid chamber 719, lower fluid chamber 745, tuning passage 709, lower tuning chamber 747, and upper tuning chamber 749 be the same; however, it should be understood that differing fluids may be used, depending upon the application and the desired response of vibration eliminator 701. Elastomer member 707 allows for transfer of load to and from piston assembly 705 and housings 703 and 745. Elastomer member 707 also functions as a spring to permit piston assembly 705 to move or oscillate relative to housings 703 and 745. When no load is applied, elastomer member 707 functions to locate piston assembly 705 generally central to housings 703 and 745.

Tuning passage 709 extends centrally through a longitudinal axis of piston assembly 705 and permits isolation fluid 731 to move between upper fluid chamber 719 and lower fluid chamber 725. The approximate length of tuning passage 709, in relation to the physical features of piston assembly 705, is defined by T3 in FIG. 8. Bulb portion 715 of metering pin assembly 711 is at least partially disposed within the tuning passage 709. Seepage path 723 allows for pressure equalization between each bore 729 and its surrounding volume as metering pin assembly 711 moves relative to piston assembly 705 and housings 703 and 745. Metering pin assembly 711 is controlled by a metering pin actuator 713. Metering pin actuator 713 is located in housing 703 and is secured by bores 729. Bores 729 secure metering pin assembly 711 in the radial direction while allowing metering pin assembly 711 to translate in the axial direction via mechanical screw drive 717.

The introduction of a force into pylon attachment bracket 721 translates piston assembly 705 relative to housings 703 and 745. The movement of piston assembly 705 forces isolation fluid 731 to move in the opposite direction through tuning passage 709. Movement of fluid 731 produces an inertial force that cancels, or isolates, the force from piston assembly 705 at a discrete frequency. The actuation of metering pin assembly 711 (via metering pin actuator 713) either up or down, increases or decreases, respectively, the effective diameter of tuning passage 709. Decreasing the effective diameter of tuning passage 709 is caused by further insertion of bulb portion 715 of metering pin assembly 711 into tuning passage 709. Increasing the effective diameter of tuning passage 709 is caused by partial retraction of bulb portion 715 of metering pin assembly 711 from tuning passage 709. Increasing or decreasing the effective diameter of tuning passage 709, increases or decreases, respectively, the isolation frequency. The essentially linear relationship between effective diameter (d) of tuning passage 709, diameter of piston assembly 705 (D), spring rate of elastomer member 707 (K), length T3 of tuning passage 709 (L), mass density of isolation fluid 731 (ρ), gravity (g), and the isolation frequency (f), is given by the following equation:

$$f = \sqrt{\frac{4Kg}{D^2\left(\frac{D^2}{d^2}-1\right)\pi L\rho}}$$

Actuation of metering pin actuator 713, which translates metering pin assembly 711 via screw drive 717, provides a simple mechanical means for tracking frequency isolation during flight. In this alternative embodiment, actuation of metering pin actuator 713 is driven mechanically by at least one electrical servo motor 739. Electrical servo motor 739 is powered via electrical leads 741. Electrical servo motor 739 is generally configured to track predicted frequencies, but could also be configured to track measured frequencies from selected instrumentation and sensors, such as accelerometers. It should be appreciated that other alternative embodiments may employ the use of hydraulic actuators, pneumatic actuators, electromagnetic actuators, or the like, to actuate metering pin actuator 713. Continuous actuation of metering pin actuator 513 allows for continuous tracking of frequency isolation. This embodiment provides for automatic adjustment of the meterable liquid inertia vibration eliminator.

According to this alternative embodiment of the present application, tuning passage 709 is generally circular in cross-section. Generally, the diameter of tuning passage 709 enlarges near bulb portion 715 of metering pin assembly 711. Adjustable metering pin assembly 711 translates up or down by adjustment of metering pin actuator 713. Actuator 713 utilizes a mechanical screw drive 717 in order to translate pin 711 up or down. Although it is preferred that mechanical screw drive 717 be used to translate pin 711, it will be appreciated that alternative embodiments may employ any effective means to translate pin 711 relative to piston assembly 705.

A first tunable active tuning element 735, operably associated with a first actuating piston 743, is coupled to upper housing 703. In a similar fashion, a second tunable active tuning element 751, operably associated with a second actuating piston 744, is coupled to lower housing 745. First and second active tuning elements 735, 751 are electrically coupled via electrical leads 737, 738 to control circuitry (not shown) for controlling the actuation of respective actuating pistons 743, 744, respectively. Respective elastomer seals and spring members 733 and 734 seal and resiliently locate actuating pistons 743, 744 to upper and lower housings 703, 745. Upper and lower tuning chambers 747, 749 supplement frequency isolation occurring in upper fluid chamber 719 and lower fluid chamber 725. Actuation of actuating pistons 743 and 744 at selected frequencies and amplitudes amplify the displacement of isolation fluid 731 and cancel out the frequency of the oscillatory forces from a vibrating body (not shown). In this manner, the oscillatory vibration from the vibrating body are prevented from transferring to the body to be isolated.

It is preferred that active tuning elements 735 and 751 are piezoceramic elements that oscillate in the range of about 16.6 Hz to about 19.9 Hz to counteract vibration from the vibrating body. However, it should be understood that active tuning elements 735 and 751 may be comprised of other smart materials, such as magnetostrictive, or may comprise other means, such as electromagnetic, pneumatic, hydraulic, and the like.

It is apparent that an application with significant advantages has been described and illustrated. Although the present application is shown in a limited number of forms, it is not limited to just these forms, but is amenable to various changes and modifications without departing from the spirit thereof.

The invention claimed is:

1. A vibration isolator, comprising:
    a housing defining a fluid chamber;
    a fluid disposed within the fluid chamber;
    a piston assembly resiliently disposed within the housing;
    a tuning passage defined by the piston assembly;
    at least one bracket coupled to the piston assembly for transferring forces to the piston assembly; and
    an adjustable metering pin assembly configured for changing an effective diameter of the tuning passage, the metering pin assembly including a bulb portion at least partially disposed within the tuning passage, the metering pin assembly selectively translating relative to the entire housing and the piston assembly;
    wherein the bulb portion is conical in shape;
    wherein the tuning passage is circular in cross-section;
    wherein a diameter of the tuning passage enlarges near the bulb portion of the metering pin assembly; and
    wherein the metering pin assembly extends through the housing and is secured at a first end by a first bore and at a second end by a second bore.

2. The vibration isolator according to claim 1, wherein the tuning passage is formed by the piston assembly, so as to divide the fluid chamber into two volumes that are in fluid communication.

3. The vibration isolator according to claim 1, wherein the piston is resiliently coupled to the housing with at least one elastomer member.

4. The vibration isolator according to claim 1, wherein the piston comprises:
    a tuning passage portion; and
    a support frame.

5. The vibration isolator according to claim 1, further comprising:
    a metering pin actuator operably associated with the metering pin assembly for selectively adjusting the position of metering pin assembly.

6. The vibration isolator according to claim 5, further comprising:
    an actuation device operably associated with the metering pin actuator;
    wherein the actuation device is selected from the group consisting of:
        an electric actuator;
        a hydraulic actuator;
        a pneumatic actuator; and
        an electromagnetic actuator.

7. The vibration isolator according to claim 5, wherein the metering pin actuator utilizes a mechanical screw drive to translate the metering pin assembly.

8. The vibration isolator according to claim 1, wherein the housing is coupled to a roof beam of an aircraft.

9. The vibration isolator according to claim 1, wherein the piston assembly is coupled to a pylon assembly of an aircraft.

10. The vibration isolator according to claim 4, wherein the metering pin assembly is slidingly coupled to the support frame.

11. The vibration isolator according to claim 1, further comprising:
a seepage path for providing pressure equalization between the fluid chamber and each of the bores.

12. An aircraft, comprising:
an airframe;
a pylon assembly carried by the airframe; and
a vibration isolator disposed between the airframe and the pylon assembly, the vibration isolator comprising:
a housing defining a fluid chamber;
a fluid disposed within the fluid chamber;
a piston assembly resiliently disposed within the housing;
a resilient member for resiliently coupling the piston assembly to the housing; and
an adjustable metering pin assembly coupled to the housing for changing an effective diameter of a tuning passage, a bulb portion of the metering pin assembly being disposed at least partially within the tuning passage, the metering pin assembly selectively translating relative to the entire housing and the piston assembly;
wherein the bulb portion of the metering pin assembly is conical in shape;
wherein the tuning passage is circular in cross-section;
wherein a diameter of the tuning passage enlarges near the bulb portion of the metering pin assembly;
wherein the adjustable metering pin assembly extends through the housing; and
wherein the adjustable metering pin assembly is secured at a first end by a first bore and at a second end by a second bore.

13. The aircraft according to claim 12, wherein the frequency response of the vibration isolator is adjusted by actuation of the metering pin assembly.

14. A vibration isolator, comprising:
a housing defining an upper fluid chamber and lower fluid chamber;
a fluid disposed within the upper fluid chamber and the lower fluid chamber;
a piston assembly resiliently disposed within the housing, the piston assembly defining a tuning passage between the upper fluid chamber and the lower fluid chamber;
an adjustable metering pin assembly for changing an effective diameter of the tuning passage, the metering pin assembly selectively translating relative to the entire housing and the piston assembly;
at least one tuning element operably associated with at least one of the upper fluid chamber and the lower fluid chamber; and
an actuating piston coupled to each tuning element for amplifying the displacement of the fluid in the corresponding fluid chamber;
wherein the adjustable metering pin assembly extends through the housing;
wherein the adjustable metering pin assembly is secured at a first end by a first bore and at a second end by a second bore;
wherein the adjustable metering pin assembly includes a bulb portion having a conical shape, the bulb portion at least partially disposed within the tuning passage;
wherein the tuning passage is circular in cross-section; and
wherein a diameter of the tuning passage enlarges near a bulb portion of the metering pin assembly.

15. The vibration isolator according to claim 14, further comprising:
at least one electric servo motor for actuating the metering pin actuator.

16. The vibration isolator according to claim 15, wherein the at least one electric servo motor automatically actuates the metering pin actuator in response to a signal from a sensor.

17. The vibration isolator according to claim 14, wherein the tuning element comprises a material selected from the group consisting of:
piezoceramic;
magnetostrictive; and
electromagnetic.

18. A method of adjusting the frequency response in a vibration isolator, comprising:
providing a housing defining a fluid chamber;
resiliently disposing a piston within the housing, the piston forming a tuning passage within the fluid chamber;
operably associating an adjustable metering pin assembly with the tuning passage; and
selectively actuating the adjustable metering pin assembly so as to change an effective diameter of the tuning passage, thereby adjusting the frequency response of the vibration isolator;
wherein the adjustable metering pin assembly extends through the housing;
wherein the adjustable metering pin assembly is secured at a first end by a first bore and at a second end by a second bore;
wherein the metering pin assembly is selectively translating relative to the entire housing and the piston;
wherein the tuning passage is circular in cross-section;
wherein the metering pin assembly includes a bulb portion having a conical shape, the bulb portion at least partially disposed within the tuning passage; and
wherein a diameter of the tuning passage enlarges near the bulb portion of the metering pin assembly.

* * * * *